(12) United States Patent
Ritter

(10) Patent No.: US 7,641,218 B2
(45) Date of Patent: Jan. 5, 2010

(54) GAS BAG BLANK AND METHOD OF MANUFACTURING A GAS BAG

(75) Inventor: Philipp Ritter, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 509 days.

(21) Appl. No.: 11/334,114

(22) Filed: Jan. 18, 2006

(65) Prior Publication Data

US 2006/0178065 A1 Aug. 10, 2006

(30) Foreign Application Priority Data

Feb. 4, 2005 (DE) .................. 10 2005 005 246

(51) Int. Cl.
*B60R 21/16* (2006.01)
(52) U.S. Cl. .................................. 280/728.1
(58) Field of Classification Search .............. 280/728.1, 280/743.1
See application file for complete search history.

(56) References Cited

U.S. PATENT DOCUMENTS

| 5,316,337 | A | 5/1994 | Yamaji et al. |
| 5,520,414 | A | 5/1996 | Bishop |
| 5,671,935 | A | 9/1997 | Berger et al. |
| 5,975,571 | A | 11/1999 | Ford et al. |

FOREIGN PATENT DOCUMENTS

| DE | 19811200 | 3/2002 |
| DE | 69532776 | 2/2005 |
| EP | 0681536 | 11/1995 |
| EP | 0714813 | 6/1996 |
| JP | 07009930 | 1/1995 |

*Primary Examiner*—Arti Singh-Pandey
(74) *Attorney, Agent, or Firm*—Tarolli, Sundheim, Covell & Tummino LLP

(57) ABSTRACT

A two-dimensional gas bag blank (10) has a first, a second, and a third side section (12, 14, 16). The first side section (12) is connected to the second side section (14) via a common side edge (18) forming a first edge fold line (18k), and the second side section (14) is connected to the third side section (16) via a common side edge (20) forming a second edge fold line (20k). A surface fold line (12s, 14s, 16s) extends on the surface of each section (12, 14, 16). The surface fold lines (12s, 14s, 16s) form an acute angle with the respective adjacent edge fold lines (18k, 20k).

9 Claims, 8 Drawing Sheets

GAS BAG BLANK AND METHOD OF MANUFACTURING A GAS BAG

FIELD OF THE INVENTION

The invention relates to a gas bag blank and a method of manufacturing a gas bag.

BACKGROUND OF THE INVENTION

Sewing a gas bag is one of the most labor-intensive and thus most expensive manufacturing steps in the production of a gas bag. Primarily with gas bags that obtain their three-dimensional shape in the inflated shape by the fact that their outer envelope does not only consist of two strips flatly sewn on top of each other, there is often the necessity to close seams for which the blank parts cannot be spread on a table completely flatly. This kind of fabrication is, of course, laborious and expensive. It is, therefore, endeavored to create gas bag blanks also for three-dimensional gas bags in which all of the seaming processes may be carried out with so-called "two-dimensional seams", with the blank parts lying flatly on a base.

BRIEF SUMMARY OF THE INVENTION

It is an object of the invention to create a gas bag blank from which the gas bag may be produced with a minimum of sewing processes.

This object is achieved in a two-dimensional gas bag blank including a first, a second and a third side section, the first side section being connected to the second side section via a common side edge forming a first edge fold line, and the second side section being connected to the third side section via a common side edge forming a second edge fold line. A surface fold line extends on the surface of each side section, and the surface fold lines form an acute angle with the respective adjacent edge fold lines. When sewing the gas bag together from the blank, the shape of the gas bag blank permits to accomplish this with only three seaming processes altogether.

The fold lines designate those sites on which the blank is folded in forming the finished gas bag and preferably do not differ physically from the remaining portion of the blank. The fold lines described here serve for folding the gas bag when sewing it together and have nothing to do with folding the finished gas bag to a packet for accommodating it in a housing.

The edges of the individual side sections, as far as they are not already connected via the side edges to a further section of the blank, serve as a fastening zone. In these portions the seams for producing the gas bag are carried out and the side sections are attached to each other.

Apart from sewing the side sections of the gas bag blank other types of fastening, e.g. by bonding, ultrasonic welding or any other suitable method, could also be used.

The surface fold lines separate each side section (theoretically) in one bottom and one top partial section each. The terms "top" and "bottom" serve for the better explanation of the invention and are randomly chosen.

According to an advantageous embodiment of the invention a bottom partial section of the first side section comprises a mirror-inverted shape with respect to a bottom partial section of the second side section, a top partial section of the second side part comprises a mirror-inverted shape with respect to a top partial section of the third side section, and a bottom partial section of the third side section comprises a mirror-inverted shape with respect to a top part of the first side section.

In this embodiment the bottom partial section of the first side section adjoins via the first edge fold line the bottom partial section of the second side section. The top partial section of the second side section adjoins via the second edge fold line the top partial section of the third side section.

Preferably, the first and second side sections are shaped substantially identically. Preferably, also the third side section and the first side section are shaped identically.

In a preferred embodiment of the invention the surface fold lines extend in a zigzag line, as viewed across all side sections, with adjacent surface fold lines each extending here in an obtuse angle with respect to one another.

According to a preferred embodiment the first and second side sections and the third side section comprise a substantially hexagonal shape. In this way an excellent surface-to-volume ratio is achieved for the gas bag.

It is another object of the invention to provide a method of manufacturing a gas bag with few process steps to reduce the manufacturing costs.

This object is achieved by a method of manufacturing a gas bag for a vehicle occupant restraint system, including the following steps:

a) providing a gas bag blank of the type as described above, which is adapted to be spread two-dimensionally, b) folding the first side section at the first fold line and flatly placing the first side section on the second side section, c) connecting the bottom partial sections of the first and second side sections to one another at least in sections, d) folding back a top partial section of the first side section along the surface fold line of the first side section, e) folding the third side section at the second edge fold line and placing the third side section flatly on the second side section, f) connecting a top partial section of the third side section and a top partial section of the second side section to each other, g) folding the partial sections over such that the top partial section of the first side section and the bottom partial section of the third side section are disposed on one side of the surface fold line and all the other partial sections are disposed on the other side, and h) connecting the bottom partial section of the third side section to the top partial section of the first side section.

In step e) the partial section of the first side section that is folded back is disposed between the third side section and the second side section.

In step g) it is important to have the top partial section of the first side part and the bottom partial section of the third side section flatly placed on top of each other without any disturbing further sections of the gas bag. Which of the respective other partial sections of the gas bag that are already placed on top of each other are folded towards the side for this purpose is of no significance.

For all connections the sections and partial sections of the gas bag blank to be connected in each instance may be spread completely flatly.

According to a preferred embodiment a receiving opening for a gas generator or an inflow opening for pressurized gas is configured in a partial region of the connection between the bottom partial sections of the first and second side sections.

In another preferred embodiment it is provided for that a receiving opening for a gas generator or an inflow opening for pressurized gas is configured in the bottom part of the second side section. These receiving or inflow openings may, of course, be provided at another suitable location as well.

It is possible to configure at least one vent hole, it being possible to provide sections of the vent hole at one and/or both ends each of the surface fold lines. Since the vent holes already exist in the blank, no subsequent processing of the finished gas bag is required.

In a further preferred embodiment of the invention the gas bag blank is assembled from two individual pieces of material prior to step a). The two pieces of material may have an identical outer contour. Preferably, the shape of one of the pieces of material corresponds to the shape of the third side section or of the first side section with the bottom or top part of the second side section attached thereto. This variant permits to make a more optimum use of the lengths of fabric for the blank and thus reduce the waste of material, the advantages both of the blank in accordance with the invention and of the method in accordance with the invention being maintained.

DETAILED DESCRIPTION OF PREFERRED EMBODIMENTS

In FIGS. 1 to 6 there are shown a gas bag blank cut out from a fabric layer and a manufacturing method for a gas bag according to a first embodiment of the invention.

Figure 1:
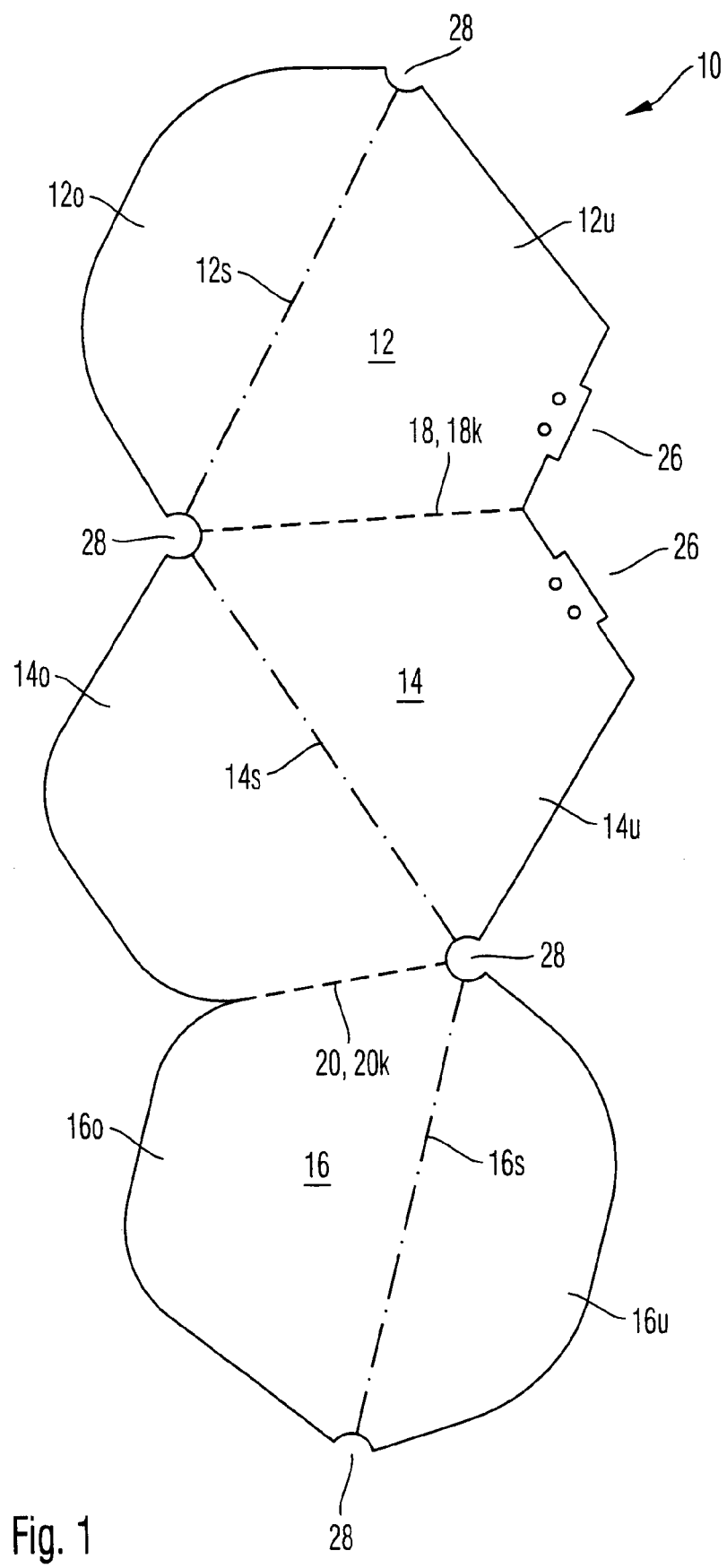
FIG. 1 shows a gas bag blank according to a first embodiment of the invention, spread flatly.

The two-dimensional gas bag blank 10 represented in FIG. 1 in a flatly spread arrangement is subdivided into three parts. A first side section 12 (at the very top in FIG. 1) is adjoined by a second side section 14, and the latter is adjoined by a third side section 16. Later on the third side section 16 will form in the inflated gas bag an impact surface for a vehicle occupant. The first side section 12 is connected to the second side section 14 along a common side edge 18 which forms a first edge fold line 18k. The transition of the second side section 14 to the third side section 16 is likewise formed by a common side edge 20 which forms a second edge fold line 20k.

All of the three side sections 12, 14, 16 have an approximately hexagonal shape. Each of the three side sections 12, 14, 16 is subdivided by an (imaginary) surface fold line 12s, 14s, 16s. The surface fold lines each extend between opposite corners of the hexagon.

The surface fold lines 12s, 14s, 16s divide the side sections 12, 14, 16 in one bottom and one top partial section each (the terms "top" and "bottom" being randomly chosen). The bottom partial section 12u of the first side section 12 and the bottom partial section 14u of the second side section 14 comprise a mirror-inverted shape. When these partial sections 12u, 14u are placed on top of one another, their edges exactly lie on top of each other. The top partial section 14o of the second side section 14 and the top partial section 16o of the third side section 16, and the bottom partial section 16u of the third side section 16 and the top partial section 12o of the first side section 12 have the same relationship. The corners of the partial sections 12o, 14o, 16u, 16o are rounded. Perpendicular to the respective surface fold line 12s, 16s the partial sections 12o, 16u have a smaller extent than the respective partial sections 12u and 16o.

The surface fold lines 12s, 14s, 16s each meet the adjacent edge fold lines 18k, 20k in an acute angle of about 60°. The exact size of the angle results from the exact shape of the side sections 12, 14, 16; it is preferably between 55° and 75°.

The gas bag blank 10 is folded along the edge and surface fold lines 18k, 20k, 12s, 14s, 16s in the method of manufacturing the gas bag described in the following, in order to connect the edge zones of the individual sections 12, 14, 16 to each other so that a three-dimensional gas bag is created.

Figure 2:
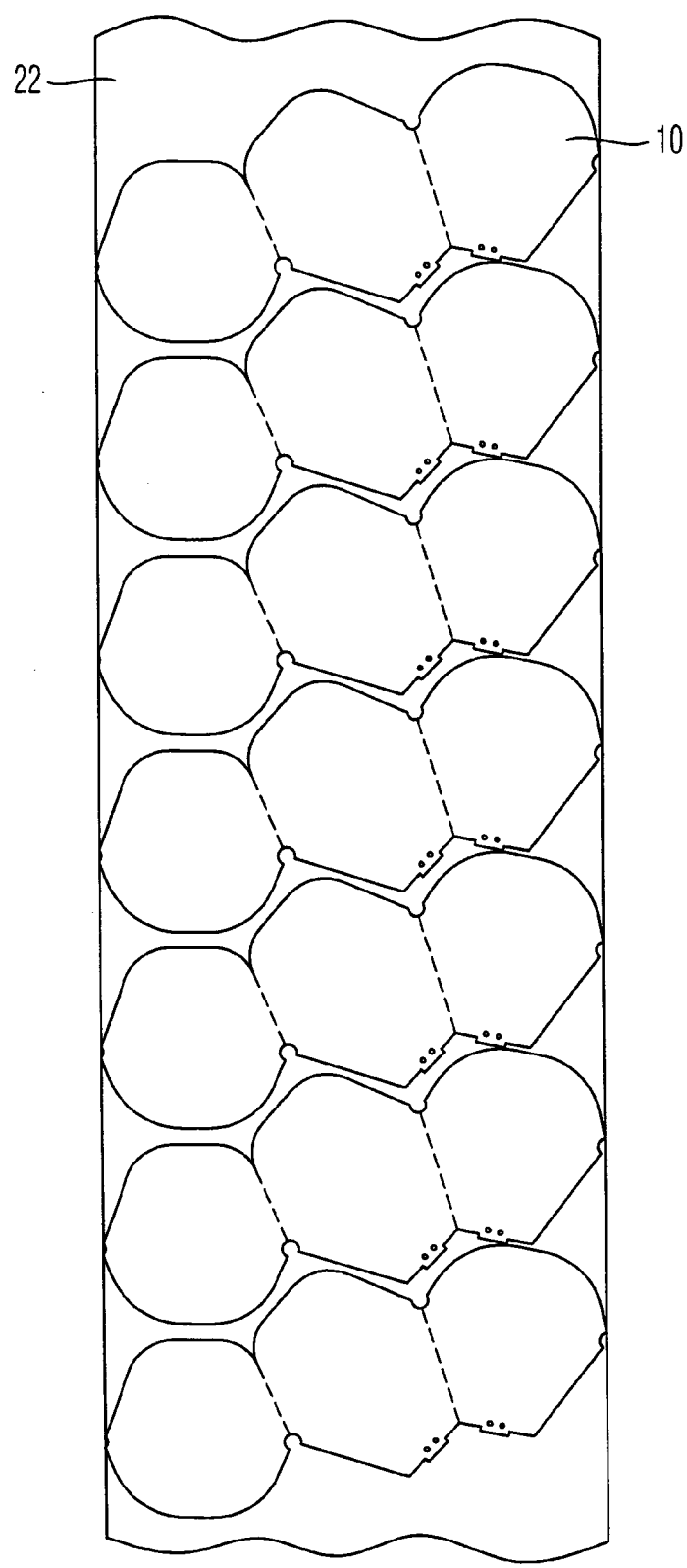
FIG. 2 schematically shows the arrangement of a plurality of gas bag blanks in accordance with the invention on a length of fabric.

As shown in FIG. 2, this shape of the blank 10 permits an excellent exploitation of a length of fabric 22, from which the blanks 10 are cut out.

Figure 3:
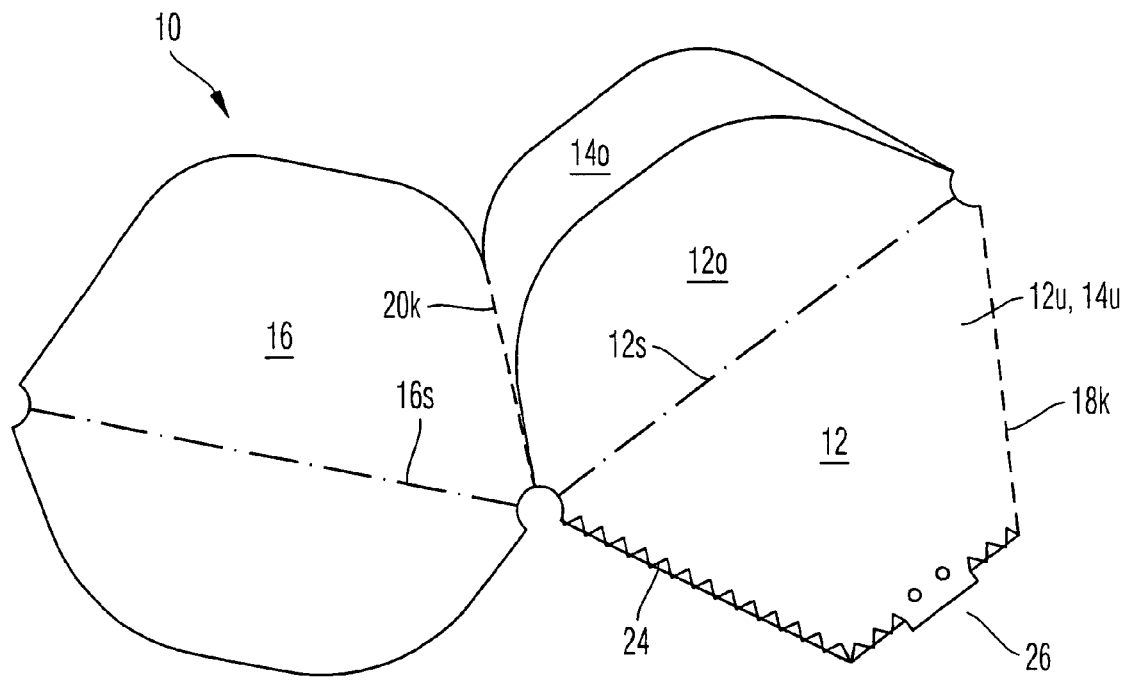
FIGS. 3 to 6 show a manufacturing method for a gas bag in accordance with the invention according to a first variant using the blank of FIG. 1.

In FIGS. 3 to 6 the method of manufacturing a gas bag from the blank 10 is represented. In a first step, the first side section 12 is folded over along the edge fold line 18k and placed on the second side section 14. The first side section 12 is shown in FIG. 3 from its rear. The bottom partial sections 12u and 14u of the first and second side sections 12, 14 now lie exactly on top of each other. Now, the two partial sections 12u, 14u are connected to each other along the free side edges by means of one or several seams 24 in a first sewing step. At the end facing away from the surface fold line 12s, 14s there remains in the seam 24 in the partial sections 12u, 14u a receiving opening 26 via which later on a gas generator (not shown) may be connected to the gas bag or pressurized gas may be introduced into the latter. For this purpose the seam 24 has only to be interrupted, but the blank does not have to be repositioned for the remaining sewing step.

Figure 4:
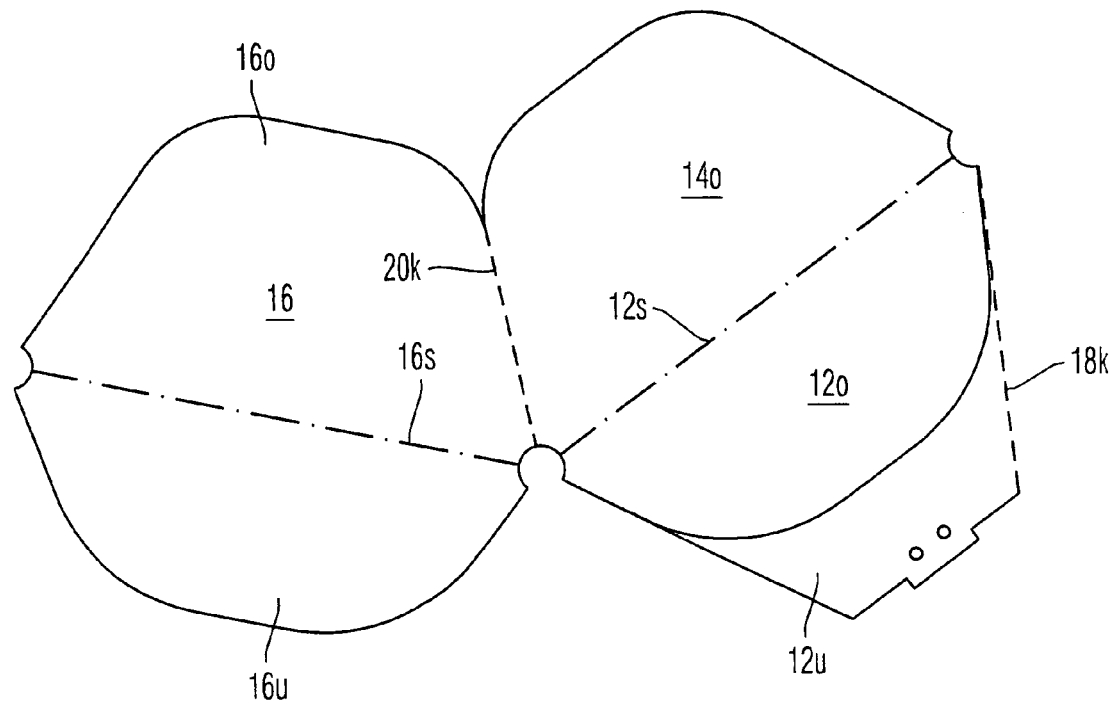

In a next step the top partial section 12o of the first side section 12 is now folded over along the surface fold line 12. This state is shown in FIG. 4.

Figure 5:
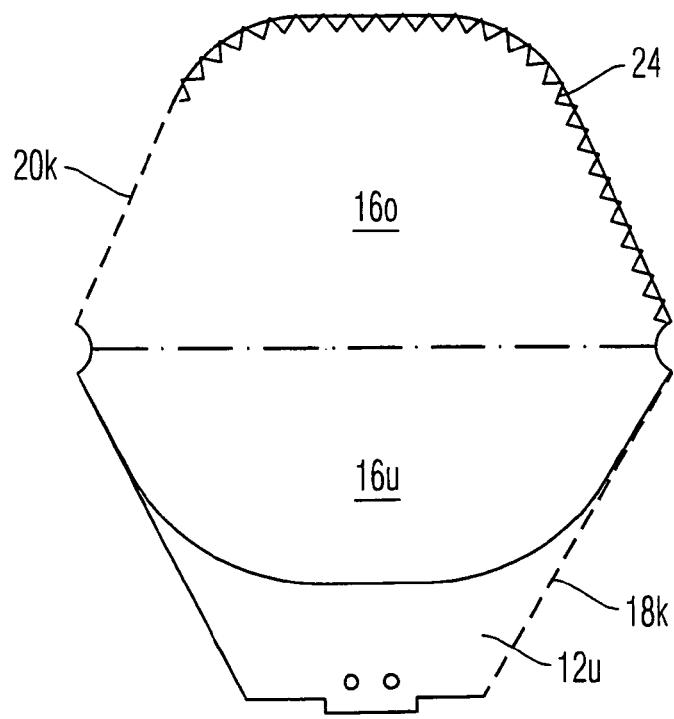
Figure 6:
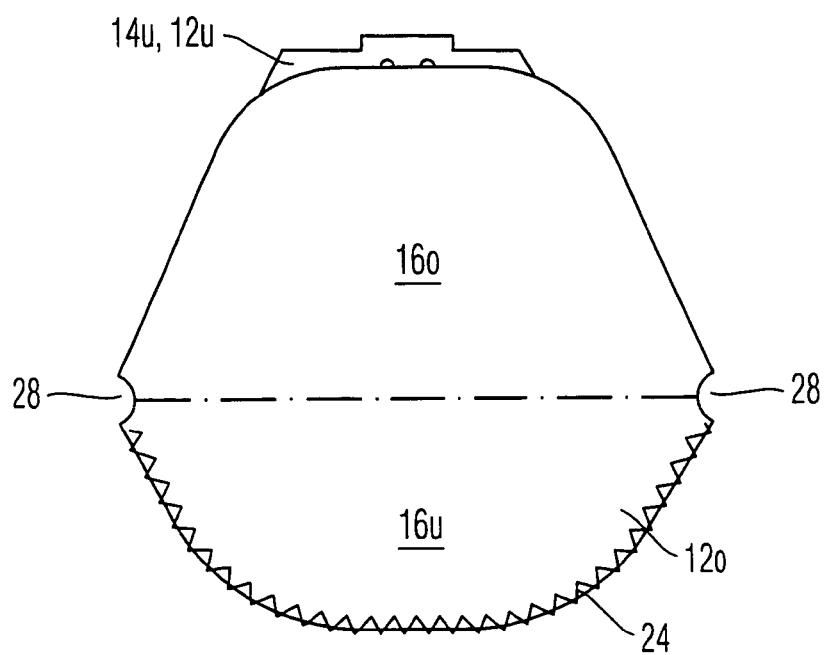

Subsequently, the third side section 16 is folded along the edge fold line 20k onto the two side sections 12, 14 which are already lying on top of each other, as this is apparent in FIG. 5. The free edges of the top partial sections 16o and 14o of the second and third side sections 14, 16 now lying on top of one another are stitched, as this is schematically represented by the seam 24.

In the last step, the partial sections 12u, 14u already connected to one another are folded over towards the top partial section 16o of the third side part 16 so that the last two partial sections 16u of the third side section 16 and 12o of the first side section 12, which are not connected to each other yet, lie on top of one another as the only plies. The free edge zones thereof are now connected by a seam 24 in a last sewing step. Thus, for producing the gas bag only three separate sewing steps are required altogether.

Provided at the ends of each of the surface fold lines 12s, 14s, 16s are partial cutouts 28 in the shape of a circular arc which form vent holes in the finished gas bag. As is apparent from FIG. 6, in the finished, inflated gas bag the vent holes are situated laterally of the impact surface for the vehicle occupant.

It is of no significance for the method in accordance with the invention, whether, as just described, the first side section 12 or the third side section 16 are first of all folded onto the second side section 14. Merely the respective steps have to be carried out in another order. Of course, the method works just as well with a blank that is mirror-inverted with respect to the blank 10 as shown.

FIGS. 7 to 11 show a further gas bag blank 100 in accordance with the invention and a method for producing a gas bag therefrom.

Figure 7:
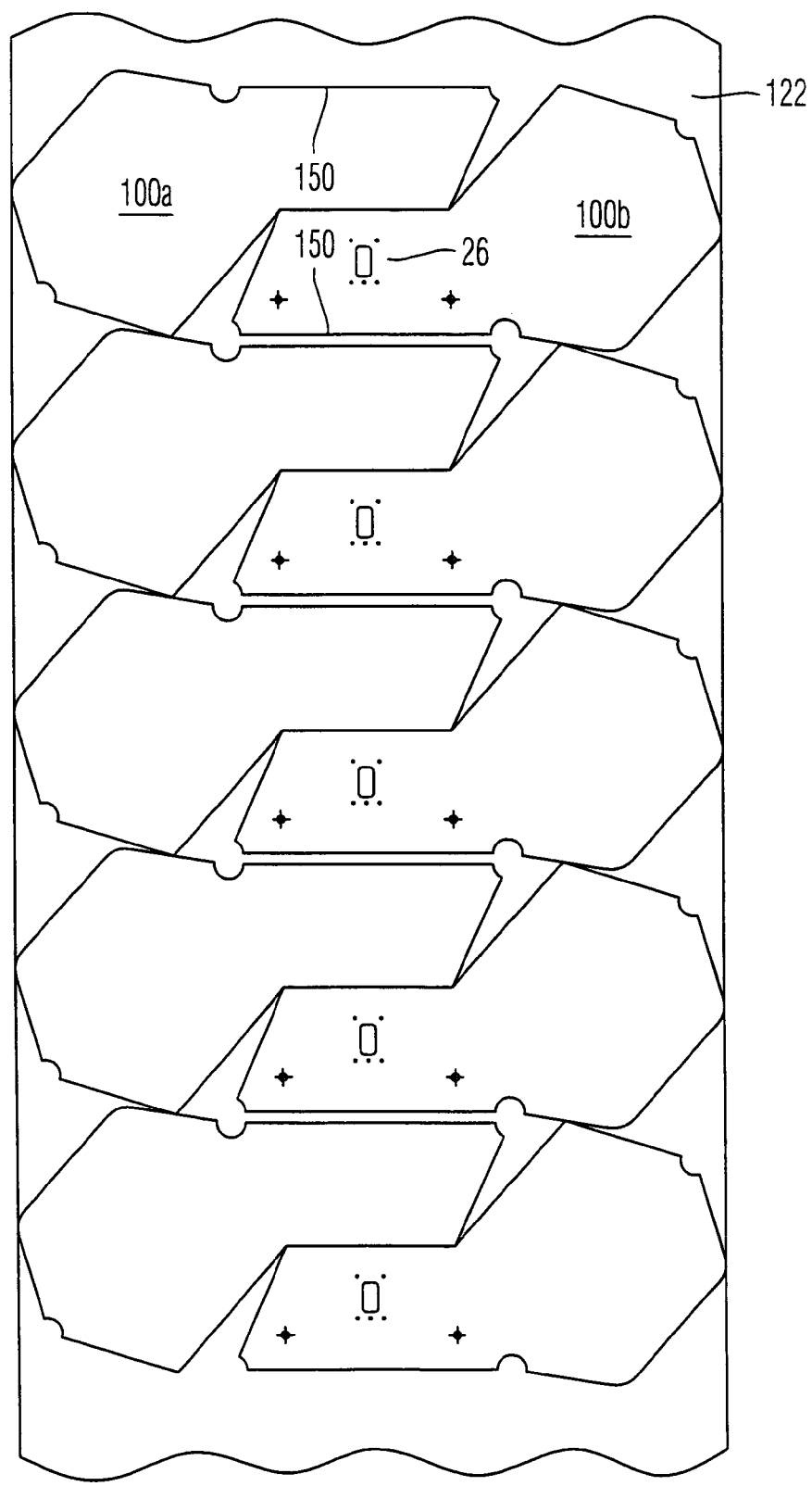
FIG. 7 shows blank parts for a gas bag blank according to a second embodiment of the invention, shown in a schematic arrangement on a length of fabric.

In FIG. 7, there is represented a length of fabric 122 from which the blanks 100 are obtained. The blank 100 is arranged on the length of fabric 122 in two individual pieces of material 100*a*, 100*b*. These pieces of material 100*a*, 100*b* are identical as regards their outer contour. However, in contrast to the piece of material 100*a* the piece of material 100*b* further comprises fastening openings and a receiving opening 26 for a gas generator or for the inflow of pressurized gas. By means of this shape of the blank a minimum waste is achieved.

Figure 8:
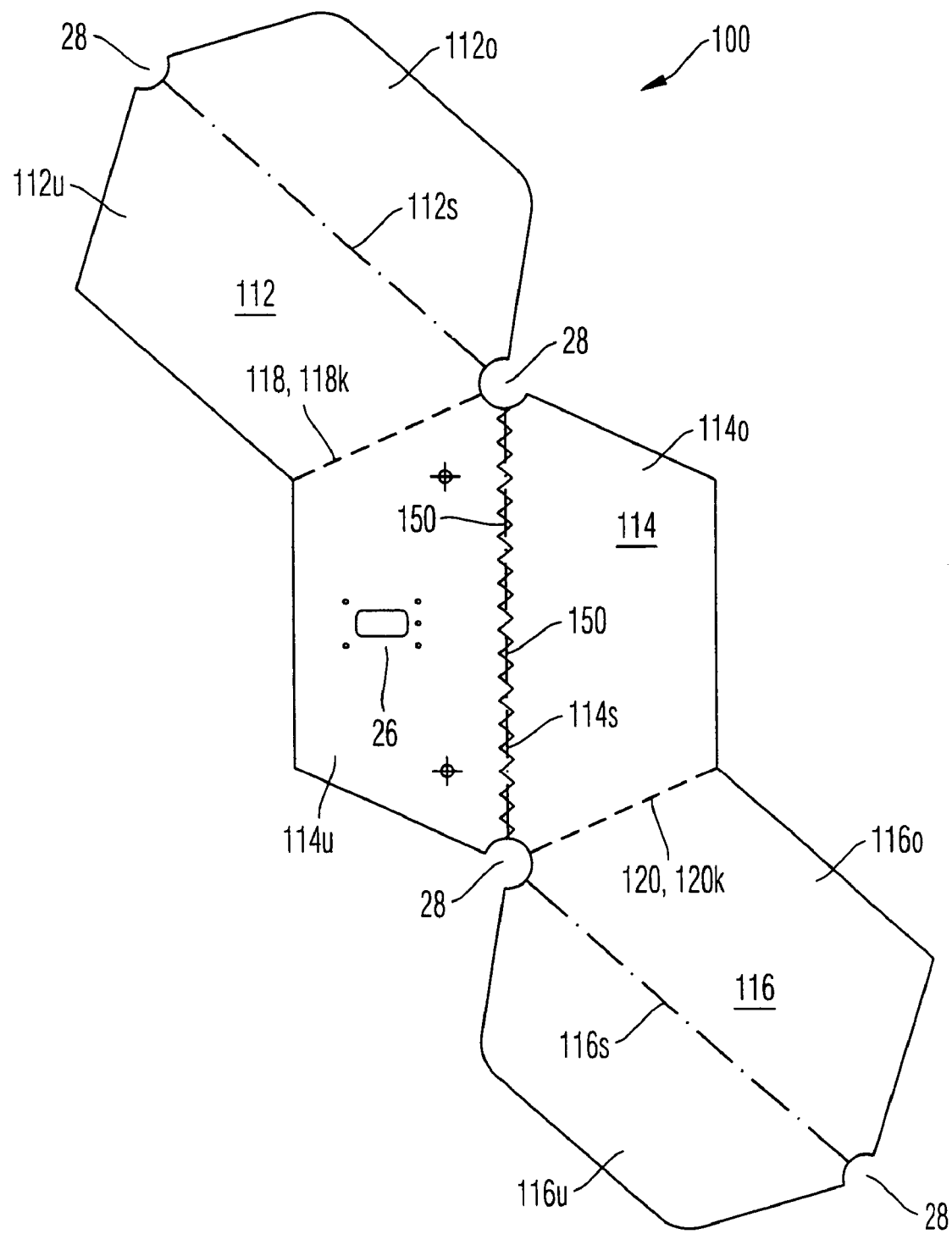
FIG. 8 shows a gas bag blank in accordance with the invention according to a second embodiment.

The two individual pieces of material 100*a*, 100*b* of the gas bag blank 100 are sewn to one another along the lines 150 shown in FIGS. 7 and 8. The two-dimensional blank 100 which is shown in FIG. 8 results therefrom.

Both the shape of the blank 100 and the method of manufacturing the gas bag are substantially analogous to those described in the first embodiment. In contrast thereto, however, the second side section 114 is configured in the shape of a hexagon symmetrical with respect to the line 150. In one direction (upwards in FIG. 8), the second side section 114 is adjoined via the common edge fold line 118*k* by the first side section 112, and in the other direction (downwards in FIG. 8) the second side section 114 is adjoined at the side edge 120 directly opposite with respect to the center of the hexagon via the common edge fold line 120*k* by the third side section 116.

In this arrangement as well, a surface fold line 112*s*, 114*s*, 116*s* extends across each surface of one of the side sections 112, 114, 116, the surface fold line 114*s* coinciding with the connecting line 150. The surface fold lines 112*s*, 114*s*, 116*s* form an acute angle with the respective adjacent edge fold lines 118*k*, 120*k*.

Figure 9:
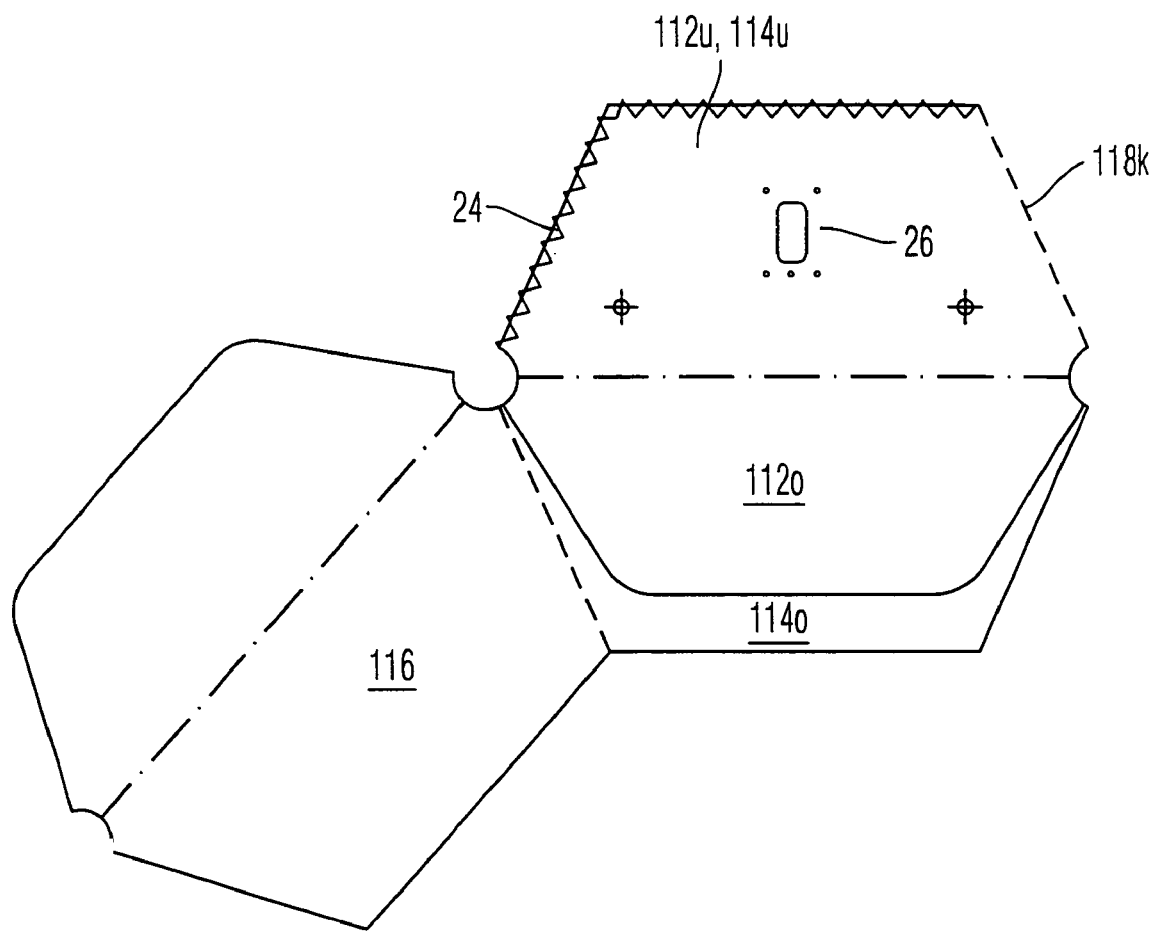
FIGS. 9 to 11 show a second method in accordance with the invention for manufacturing a gas bag using a blank according to FIG. 8.

FIG. 9 shows the first step of producing the gas bag after having assembled the two blank parts 100*a*, 100*b*. The first side section 112 was folded onto the second side section 114. In FIG. 9, the receiving opening 26 which, in reality, is concealed by the partial section 112*u* situated on top of the partial section 114*u* is still visible for orientation purposes. The free edges of the partial sections 112*u* and 114*u* are connected by a seam 24.

Figure 10:
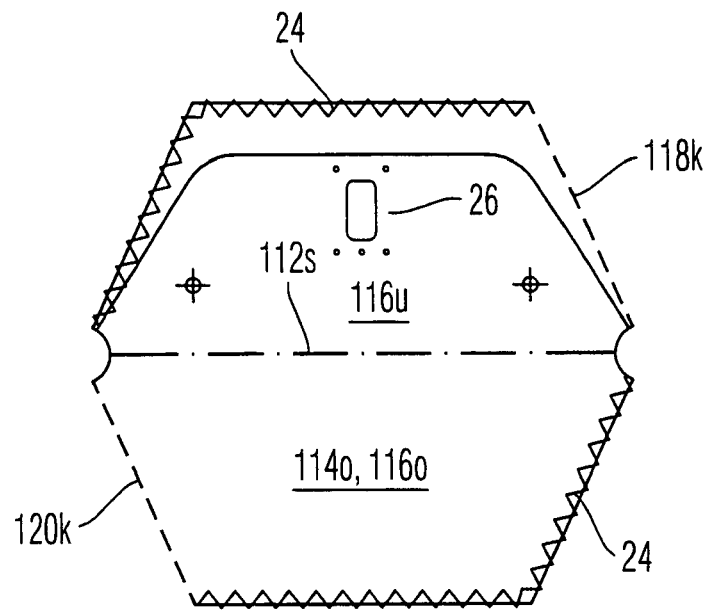

Subsequently (see FIG. 10), the partial section 112*o* in FIG. 10 is folded upwards so that it is caused to rest on the partial section 112*u*. Then, the third side section 116 is folded along the edge fold line 120*k* onto the second side section 114 and the first side section 112. The partial section 114*o* is now placed underneath the partial section 116*o*. For orientation purposes again, the receiving opening 26 and the attachment holes are shown, which are actually concealed by plies lying on top. The free edges of the partial sections 114*o* and 116*o* are connected by a seam 24.

Figure 11:
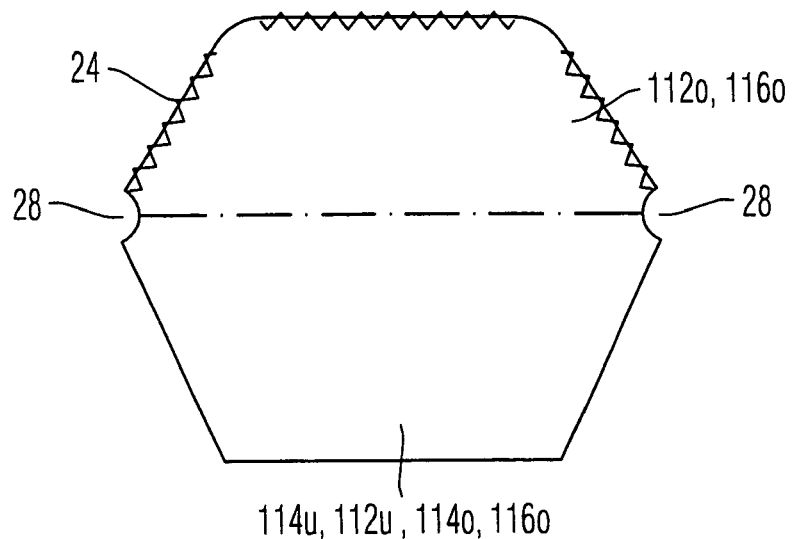

Now, the partial sections 114*u*, 112*u* in FIG. 11 that are already connected to each other are folded downwards along the surface fold lines 112*s*, 114*s*, 116*s* now lying on top of one another in parallel, with the partial sections 114*u*, 112*u*, 114*o*, 116*o* now lying on top of one another in the lower section of FIG. 11. In the upper part of FIG. 11, the two partial sections 112*o* and 116*u* are lying on top of each other. These partial sections are now connected at their free edges by a seam 24.

As in the preceding example, the gas bag blank 100 also comprises at the ends of the surface fold lines 112*s*, 114*s*, 116*s* partial cutouts 28 that form outflow openings in the finished gas bag.

The blank 100 could also be produced as a one-piece part. A mirror-inverted blank could, of course, likewise be used. The arrangements of the receiving opening 26 may be exchanged between the embodiments as desired, and other known arrangements for feeding filling gas into the gas bag are possible as well. The blank 10 described in the first embodiment could also be arranged on the length of fabric 22 in two or several parts and then assembled to a one-piece, two-dimensional gas bag blank.

The invention claimed is:

1. A gas bag blank (10; 100) including:
a first, a second and a third side section (12, 14, 16; 112, 114; 116), together forming a two-dimensional gas bag blank,
the first side section (12; 112) being connected to the second side section (14; 114) via a common side edge (18; 118) forming a first edge fold line (18*k*; 118*k*), and the second side section (14; 114) being connected to the third side section (16; 116) via a common side edge (20; 120) forming a second edge fold line (20*k*; 120*k*),
and one surface fold line (12*s*, 14*s*, 16*s*; 112*s*, 114*s*, 116*s*) extending on the surface of each section (12, 14, 16; 112, 114, 116),
the surface fold lines (12*s*, 14*s*, 16*s*; 112*s*, 114*s*, 116*s*) forming an acute angle with the respective adjacent edge fold lines (18*k*, 20*k*; 118*k*, 120*k*),
a bottom partial section (12*u*; 112*u*) of the first side section (12, 112) comprising a mirror-inverted shape with respect to a bottom partial section (14*u*; 114*u*) of the second side section (14; 114), a top partial section (14*o*; 114*o*) of the second side section (14; 114) comprising a mirror-inverted shape with respect to a top partial section (16*o*; 116*o*) of the third side section (16; 116), and
a bottom partial section (16*u*, 116*u*) of the third side section (16; 116) comprising a mirror-inverted shape with respect to a top partial section (12*o*; 112*o*) of the first side section (12; 112).

2. The gas bag blank according to claim 1, wherein the acute angle is between 55° and 75°.

3. The gas bag blank according to claim 1, wherein the bottom partial section (12*u*; 112*u*) of the first side section (12; 112) adjoins the bottom partial section (14*u*; 114*u*) of the second side section (14; 114) via the first edge fold line (18*k*; 118*k*).

4. The gas bag blank according to claim 1, wherein the first and second side sections (12, 14) are shaped substantially identically.

5. The gas bag blank according to claim 1, wherein the third side section (116) and the first side section (112) are shaped substantially identically.

6. The gas bag blank according to claim 1, wherein the top partial section (14*o*; 114*o*) of the second side section (14; 114) adjoins the top partial section (16*o*; 116*o*) of the third side section (16; 116) via the second edge fold line (20*k*; 120*k*).

7. A gas bag blank (10; 100) including:
a first, a second and a third side section (12, 14, 16; 112, 114; 116), together forming a two-dimensional gas bag blank,
the first side section (12; 112) being connected to the second side section (14; 114) via a common side edge (18; 118) forming a first edge fold line (18*k*; 118*k*), and the second side section (14; 114) being connected to the third side section (16; 116) via a common side edge (20; 120) forming a second edge fold line (20*k*; 120*k*), and one surface fold line (12s, 14s, 16s; 112s, 114s, 116s) extending on the surface of each section (12, 14, 16; 112, 114, 116), the surface fold lines (12s, 14s, 16s; 112s, 114s, 116s) forming an acute angle with the respective adjacent edge fold lines (18k, 20k; 118k, 120k), the surface fold lines (12s, 14s, 16s; 112s, 114s, 116s) extending in a zigzag line as viewed across all side sections (12, 14, 16).

8. A gas bag blank (10; 100) including:

a first, a second and a third side section (12, 14, 16; 112, 114; 116), together forming a two-dimensional gas bag blank, the first side section (12; 112) being connected to the second side section (14; 114) via a common side edge (18; 118) forming a first edge fold line (18k; 118k), and the second side section (14; 114) being connected to the third side section (16; 116) via a common side edge (20; 120) forming a second edge fold line (20k; 120k), and one surface fold line (12s, 14s, 16s; 112s, 114s, 116s) extending on the surface of each section (12, 14, 16; 112, 114, 116), the surface fold lines (12s, 14s, 16s; 112s, 114s, 116s) forming an acute angle with the respective adjacent edge fold lines (18k, 20k; 118k, 120k), the adjacent surface fold lines (12s, 14s, 16s; 112s, 114s, 116s) each extending in an obtuse angle with respect to one another.

9. The gas bag blank according to claim 7, wherein each side section (12, 14, 16; 112, 114; 116) comprises a substantially hexagonal shape.

* * * * *

UNITED STATES PATENT AND TRADEMARK OFFICE
CERTIFICATE OF CORRECTION

PATENT NO. : 7,641,218 B2 Page 1 of 1
APPLICATION NO. : 11/334114
DATED : January 5, 2010
INVENTOR(S) : Philipp Ritter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this

Sixteenth Day of November, 2010

David J. Kappos
*Director of the United States Patent and Trademark Office*